US012747347B2

(12) United States Patent
Kidd et al.

(10) Patent No.: US 12,747,347 B2
(45) Date of Patent: Sep. 29, 2026

(54) MONOLITHIC BODY COMPRISING METAL ORGANIC FRAMEWORKS

(71) Applicant: SAINT-GOBAIN CERAMICS & PLASTICS, INC., Worcester, MA (US)

(72) Inventors: Ian Kidd, Oxford, MA (US); Wesley S. Towle, North Grosvenordale, CT (US); Paul W. Rehrig, Sterling, MA (US); Mark Hampden-Smith, Chelmsford, MA (US); Choung-Houng Lai, Acton, MA (US); Lynne Kathleen Larochelle-Richard, Littleton, MA (US); Eli Kosson, Worcester, MA (US); Zachary Costantino, Framingham, MA (US); Qian Ni, Northboro, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 698 days.

(21) Appl. No.: 18/312,415

(22) Filed: May 4, 2023

(65) Prior Publication Data

US 2023/0357555 A1 Nov. 9, 2023

Related U.S. Application Data

(60) Provisional application No. 63/364,181, filed on May 4, 2022.

(51) Int. Cl.
*C08L 33/08* (2006.01)

(52) U.S. Cl.
CPC .................................. *C08L 33/08* (2013.01)

(58) Field of Classification Search
CPC ..... C08L 33/08; C08L 1/286; B01J 20/28042; B01J 20/226; B01J 20/26; B01J 20/28064; B01J 31/06; B01J 31/1691; B01J 35/56
See application file for complete search history.

(56) References Cited

U.S. PATENT DOCUMENTS 3,949,021 A * 4/1976 Kunitomo .............. G02B 1/043 525/283
6,169,062 B1 * 1/2001 Salager .............. C11D 17/0082 510/474

(Continued)

FOREIGN PATENT DOCUMENTS

CN 112679965 B 10/2022
JP 2006504516 A 2/2006

(Continued)

OTHER PUBLICATIONS

Ntouros, Vasileios, et al. Binding Materials for MOF Monolith Shaping Processes: A Review towards Real Life Application. Energies, vol. 15, No. 4, Jan. 1, 2022, p. 1489, www.mdpi.com/1996-1073/15/4/1489, https://doi.org/10.3390/en15041489. (Year: 2022).*

(Continued)

*Primary Examiner* — Doris L Lee

(74) *Attorney, Agent, or Firm* — Abel Schillinger, LLP; Jermaine Lawrence

(57) ABSTRACT

A monolithic body can comprise metal organic frameworks (MOFs) and a polymeric binder, wherein the monolithic body may have a crush strength of at least 10 N; an amount of the polymeric binder is at least 3 wt % based on the total weight of the MOFs and polymeric binder; and the polymeric binder comprises a first polymer and a second polymer, the first polymer having a water solubility of not greater than 5 g/L of water at 25° C., and the second polymer having a water solubility of at least 10 g/L of water at 25° C.

20 Claims, 1 Drawing Sheet

(56) References Cited

U.S. PATENT DOCUMENTS

| | | | |
|---|---|---|---|
| 7,524,444 B2 | 4/2009 | Hesse | |
| 7,931,960 B2 | 4/2011 | Hesse | |
| 10,737,239 B2 | 8/2020 | Burckhart | |
| 11,986,796 B2 | 5/2024 | Holbrook et al. | |
| 2006/0019853 A1 | 1/2006 | Wieprecht et al. | |
| 2011/0201727 A1* | 8/2011 | Hashemzadeh | C08L 83/08 524/588 |
| 2018/0053968 A1* | 2/2018 | Sava Gallis | H01M 50/107 |

FOREIGN PATENT DOCUMENTS

| | | | | |
|---|---|---|---|---|
| JP | 2019527798 A | | 10/2019 | |
| WO | 0013794 A1 | | 3/2000 | |
| WO | 2006050898 A1 | | 5/2006 | |
| WO | 2018006078 A1 | | 1/2018 | |
| WO | 2020113281 A1 | | 6/2020 | |
| WO | WO-2021107992 A1 | * | 6/2021 | B01J 20/2803 |
| WO | 2021153626 A1 | | 8/2021 | |

OTHER PUBLICATIONS

International Search Report and Written Opinion for PCT/US2023/066610, mailed Aug. 28, 2023, 10 pages.

Zhu, H. et al., "Assembly of a metal-organic framework into 3 D hierarchical porous monoliths using a pickering high internal phase emulsion template", Chemistry—A European Journal, 2016, vol. 22, No. 26, pp. 8751-8755.

* cited by examiner

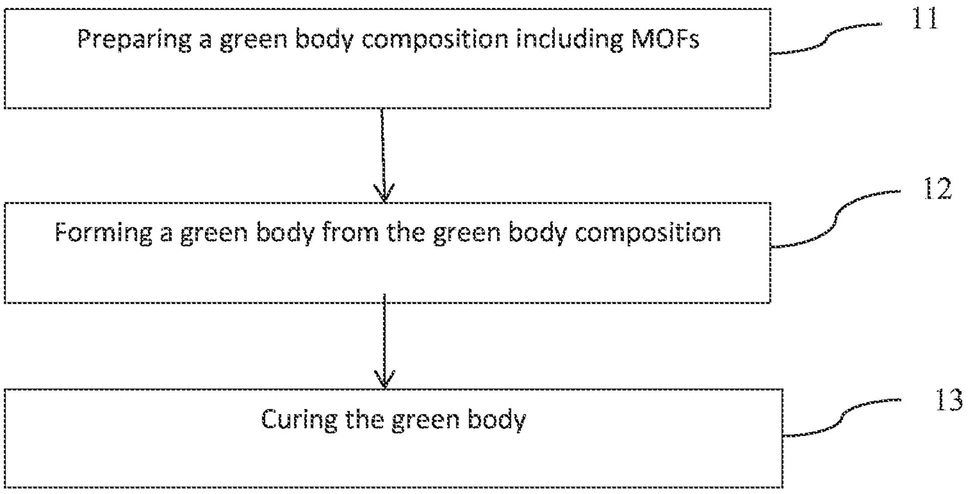
Preparing a green body composition including MOFs
11
Forming a green body from the green body composition
12
Curing the green body
13

MONOLITHIC BODY COMPRISING METAL ORGANIC FRAMEWORKS

CROSS-REFERENCE TO RELATED APPLICATION(S)

This application claims priority under 35. U.S.C. § 119(e) to U.S. Provisional Application No. 63/364,181, entitled "MONOLITHIC BODY COMPRISING METAL ORGANIC FRAMEWORKS," by Ian KIDD et al., filed May 4, 2022, which is assigned to the current assignee hereof and incorporated herein by reference in its entirety for all purposes.

FIELD OF THE DISCLOSURE

The present disclosure relates to a monolithic body comprising metal organic frameworks (MOFs) and a polymeric binder.

BACKGROUND

Metal organic frameworks (MOFs) are coordination networks of metal ions and organic ligands and are a class of compounds known for its unique combination of properties, such as high surface area, high porosity, and a flexible adsorption/desorption behavior. MOFs can be tailor-made for adsorbing a desired type of molecule or ion with high selectivity.

There exists a need of integrating MOFs in suitable bodies for industrial use, wherein the delicate network structure of MOFs and properties can be maintained to a large extent.

BRIEF DESCRIPTION OF THE DRAWINGS

The present disclosure may be better understood, and its numerous features and advantages made apparent to those skilled in the art by referencing the accompanying drawings.

FIG. 1 includes a scheme illustrating a method of making the body of the present disclosure according to one embodiment.

DETAILED DESCRIPTION

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

As used herein, and unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The present disclosure is directed to a monolithic body comprising metal organic frameworks (MOFs) and a polymeric binder, wherein the polymeric binder can comprise a first polymer and a second polymer, the first polymer being water-insoluble with a water solubility of not greater than 5 g/L of water at 25° C., and the second polymer being water-soluble with a water solubility of at least 10 g/L of water at 25° C. The amount of the polymeric binder can be at least 3 wt % based on the total weight of the MOFs and the polymeric binder; and an average crush strength of the monolithic body can be at least 10 N.

As used herein, the term "polymeric binder," if not indicated otherwise, relates to the combination of the first polymer and the second polymer. In one aspect, the first polymer and the second polymer can be at least partially cross-linked with each other.

The monolithic body can be designed for industrial applications of adsorbing/desorbing a desired type of molecule or ion. For example, in non-limiting embodiments, the monolithic body can be used for adsorbing carbon dioxide or methane, or for storage of hydrogen, water and air purification, or in catalytic applications.

As used herein, the term "metal organic frameworks" (MOFs) relates to any compound forming a network of metal ions with coordinated organic ligands.

The method of forming the monolithic body of the present disclosure can comprise preparing a green body composition including MOFs (11), forming a green body from the green body composition (12), and curing the green body (13) to obtain the monolithic body, as illustrated in FIG. 1.

In embodiments, forming the green body from the green body composition can include screen printing, extruding, slip casting, or 3D printing.

The final shape and size of the monolithic body can vary largely. For example, the shape of the monolithic body can be a pellet, or a tube, or a sheet, or may have a ball-like shape. In another aspect, the monolithic body can have an irregular shape.

The polymeric binder can comprise a combination of at least one first polymer (P1) and at least one second polymer (P2). In one aspect, the first polymer can be a water-insoluble polymer having a water solubility at 25° C. of not greater than 5 g/L, or not greater than 3 g/L, or not greater than 1 g/L, or not greater than 0.5 g/L. In contrast to the first polymer, the second polymer can be a water-soluble polymer having a water solubility at 25° C. of at least 10 g/L, or at least 30 g/L, or at least 50 g/L, or at least 100 g/L. As used herein, if not indicated otherwise, the term "first polymer" (P1) relates to the above-described water-insoluble polymer, and the term "second polymer" (P2) relates to the above-described water-soluble polymer.

In one embodiment, the first polymer can comprise functional groups which can react with functional groups of the second polymer by forming covalent bonds, herein also called cross-linking.

In one aspect, non-limiting examples of the functional groups of the first polymer can be amine groups, hydroxyl groups, acrylate groups, vinyl groups, thiol groups, carboxyl groups, or epoxy groups. In another aspect, non-limiting examples of functional groups of the second polymer can also be amine groups, hydroxyl groups, acrylate groups, vinyl groups, thiol groups, carboxyl groups or epoxy groups, as long the functional groups differ between the first and second polymer to allow cross-linking reactions between the functional groups. For example, the first polymer can comprise amine groups and the second polymer can comprise carboxyl groups, which may react together to form amide groups and thereby cross-link the first polymer and the second polymer. In another aspect the first polymer can comprise hydroxyl groups and the second polymer can comprise carboxyl groups which can form together ester groups.

In a particular embodiment, the first polymer and the second polymer can react during curing of the green body and may form an at least partially cross-linked polymer.

In one embodiment, the first polymer (water insoluble polymer) can be a polyacrylate, a polystyrene, an epoxide polymer, a polyurethane, a polyester, a polyether, a polyamide, a polyimide, or any combination or copolymer thereof. In a particular aspect, the first polymer can be an emulsion polymer.

The first polymer can further include grafted substitutions which may introduce additional functional groups. For example, a polyacrylate can comprise next to the acrylate groups substitutions with amine groups, which is herein called an amine functionalized polyacrylate.

In another embodiment, the second polymer (water-soluble polymer) can be in non-limiting examples a polysaccharide, a polyethylene glycol, a polyamide, a polyvinyl alcohol, or a polyacrylate.

In one aspect, the second polymer can be a polysaccharide. Non-limiting examples of a polysaccharide can be a cellulose derivative, a starch derivative, an alginate, an alginate derivative, or any combination thereof. In a particular aspect, the cellulose derivative can be a salt of carboxymethyl cellulose, for example, sodium carboxymethyl cellulose (NaCMC).

In a certain particular embodiment, the first polymer can be a polyacrylate comprising amine functionality and the second polymer can be salt of carboxymethyl cellulose.

In embodiments, a weight percent ratio of the first polymer to the second polymer (P1:P2) can range from 1:10 to 10:1, or from 1:5 to 5:1, or from 1:2 to 4:1, or from 1:2 to 2:1, or from 1:1 to 1:10, or from 1:1 to 1:4, or from 1:1 to 4:1, or from 2:1 to 5:1.

Depending on the type of the first and second polymer of the polymeric binder, the curing can be conducted by heat or light radiation, for example, UV radiation.

The polymeric binder of the monolithic body of the present disclosure can have a structure which may be permeable for an analyte that can be adsorbed by the MOFs contained in the binder matrix. Non-limiting examples of the analyte can be water, carbon dioxide, ozone, carbon monoxide, hydrogen, methane, ammonia, nitrogen dioxide, a water pollutant, or an air pollutant.

It has been surprisingly observed that a green body compositions containing certain combinations of a water-insoluble first polymer and a water-soluble second polymer allow the inclusion of large amounts of metal organic frameworks (MOFs) such that monolithic bodies with a good strength may be formed which can maintain to a large degree the properties of the MOFs (MOFs powder before use).

The MOFs contained in the monolithic body of the present disclosure are not limited to a specific type of MOFs. The selection of the MOFs may depend on the intended use of the body of the present disclosure. Non-limiting examples of MOFs can be networks containing metal or transition metal ions aluminum, copper, iron, zirconium, zinc, or beryllium and organic ligands, for example, monovalent, divalent, trivalent, or tetravalent organic ligands. Examples of commercial MOFs can be: MIL-100, MIL-101, Numat 11, Numat25, HKUST-1, UIO-66, MOF-0, MOF-2, MOF-3, MOF-4, MOF-5, MOF-6, MOF-7, MOF-8 MOF-9, MOF-11, MOF-12, MOF-20, MOF-25, MOF-26, MOF-31, MOF-32, MOF-33, MOF-34, MOF-36, MOF-37, MOF-38, MOF-39, MOF-47, MOF-49, MOF-69a, MOF-69b, MOF-74, MOF-101, MOF-102, MOF-107, MOF-108, MOF-110, MOF-177, MOF-j, MOF-n, IRMOF-1, IRMOF-2, IRMOF-3, IRMOF-4, IRMOF-5, IRMOF-6, IRMOF-7, IRMOF-8, IRMOF-9, IRMOF-10, IRMOF-11, IRMOF-12, IRMOF-13, IRMOF-14, IRMOF-15, IRMOF-16, IRMOF-17, IRMOF-18, IRMOF-19, IRMOF-20, AS16, AS27-2, AS32, AS54-3, AS61-4, AS68-7, BPR43G2, BPR48A2, BPR49B1, BPR68D10, BPR69B1, BPR73E4, BPR76D5, BPR80D5, BPR92A2, BPR95C5, UiO-67, UiO-68, NO13, NO29, NO305, NO306A, NO330, NO332, NO333, NO335, NO336, or HKUST-1.

In one embodiment, the metal organic frameworks can comprise an average particle size of at least 0.020 μm, such as at least 0.050 μm, or at least 0.1 μm, or at least 0.2 μm, or at least 0.5 μm, or at least 1 μm, or at least 3 μm, or at least 5 μm, or at least 8 μm, or at least 10 μm. In another aspect, the average particle size of the MOFs may be not greater than 1000 μm, or not greater than 800 μm, or not greater than 500 μm, or not greater than 300 μm, or not greater than 200 μm, or not greater than 100 μm, or not greater than 50 μm, or not greater than 10 μm, or not greater than 7 μm, or not greater than 5 μm, or not greater than 1 μm, or not greater than 0.5 μm, or not greater than 0.1 μm. The average particles size of the MOFs can be a value between any of the minimum and maximum values noted above.

In a certain embodiment, the MOFs can be shaped particles. In one aspect, the shaped particles can have an aspect ratio of length to width of greater than 1.0, such as greater than 1.2, or greater than 1.5, or greater than 2.0, or greater than 3.0, or greater than 5.0, or greater than 10.0.

In one embodiment, the monolithic body can comprise as a majority of the total weight MOFs. In a particular aspect, a weight % ratio of the MOFs to the polymeric binder can be not greater than 2:1, or not greater than 5:1, or not greater than 10:1, or not greater than 15:1, or not greater than 20:1, or not greater than 25:1, or not greater than 30:1. In another aspect, the weight % ratio of the MOFs to the polymeric binder may be at least 40:1, or at least 35:1, or at least 30:1, or at least 25:1. The weight % ratio of the MOFs to the polymeric binder can be a value within a range including any of the minimum and maximum values noted above, such as from 2:1 to 40:1, or from 5:1 to 30:1, or from 10:1 to 25:1, or from 15:1 to 20:1.

In another aspect, the amount of the MOFs in the monolithic body can be at least 70 wt % based on the total weight of the monolithic body, such as at least 75 wt %, at least 80 wt %, at least 85 wt %, at least 90 wt %, at least 95 wt %, or at least 97 wt %. In a further aspect, the amount of MOFs in the monolithic may be not greater than 98 wt %, or not greater than 97 wt %, or not greater than 95 wt % based on the total weight of the functional layer. The amount of the MOFs in the monolithic body can be a value within a range including any of the minimum and maximum values noted above.

In another embodiment, the amount of the polymeric binder contained in the monolithic body can be at least 1 wt % based on the total weight of polymeric binder and MOFs, or at least 3 wt %, or at least 5 wt %, or at least 8 wt %, or at least 10 wt %, of at least 12 wt %, or at least 15 wt %, or at least 18 wt %, or at least 20 wt %. In another aspect, the amount of polymeric binder may be not greater than 30 wt % based on the total weight of polymeric binder and MOFs, such as not greater than 25 wt %, not greater than 20 wt %, not greater than 15 wt %, not greater than 10 wt %, or not greater than 5 wt %. In a particular aspect, the amount of the polymeric binder can be at least 5 wt % and not greater than 15 wt % based on the total weight of polymeric binder and MOFs. The amount of the polymeric binder can be a value between any of the minimum and maximum values noted above.

In one embodiment, the monolithic body of the present disclosure can have a normalized functionality ratio (NFR) of at least 0.5. As used herein, the normalized functionality ratio (NFR) is defined as the ratio of a property of the monolithic body to the respective property of the MOFs before inclusion in the monolithic body. In one aspect, the property can be the specific surface area (SSA), or the adsorption capacity for an analyte, or the porosity, or the pore volume.

In certain aspects, the NFR can be at least 0.55, or at least 0.60, or at least 0.65, or at least 0.7, or at least 0.75, or at least 0.8, or at least 0.85, or at least 0.9, or at least 0.92, or at least 0.94, or at least 0.95, or at least 0.96, or at least 0.97, or at least 0.99.

In another embodiment, the specific surface area (SSA) of the monolithic body can be at least 850 $m^2/g$, or at least 900 $m^2/g$, or at least 950 $m^2/g$, or at least 1000 $m^2/g$, or at least 1050 $m^2/g$, or at least 1100 $m^2/g$, or at least 1150 $m^2/g$, or at least 1200 $m^2/g$, or at least 1250 $m^2/g$, or at least 1300 $m^2/g$, or at least 1350 $m^2/g$, or at least 1400 $m^2/g$. In another aspect, the SSA of the monolithic body may be not greater than 2500 $m^2/g$, or not greater than 2000 $m^2/g$, or not greater than 1800 $m^2/g$, or not greater than 1500 $m^2/g$.

In a further embodiment, the monolithic body can have a water adsorption capacity at a temperature of 25° C. and a relative humidity of 30% of at least 0.10 g $H_2O$/g MOF, or at least 0.15 g $H_2O$/g MOF, or at least 0.17 g $H_2O$/g MOF, or least 0.20 g $H_2O$/g MOF, or at least 0.25 g $H_2O$/g MOF, or at least 0.30 g $H_2O$/g MOF.

In another embodiment, the monolithic body can have a water absorption capacity at a temperature of 25° C. and a relative humidity of 80% of at least 0.15 g $H_2O$/g MOF, or at least 0.17 g $H_2O$/g MOF, or least 0.20 g $H_2O$/g MOF, or at least 0.25 g $H_2O$/g MOF, or at least 0.30 g $H_2O$/g MOF.

In one embodiment, the method of preparing the monolithic body of the present disclosure can comprise as a first step the forming of a green body composition. In one aspect, forming the green body composition can comprise combining the MOFs, the polymeric binder (first polymer and second polymer) and a solvent, wherein the second polymer is dissolved in the solvent, and the first polymer is not dissolved in the solvent or only a minor part of the first polymer may be dissolved in the solvent. In a particular aspect, the first polymer can be an emulsion polymer.

In one aspect, a weight % ratio of the MOFs to the polymeric binder in the composition can range from 2:1 to 50:1. In certain aspects, the wt % ratio of the MOFs to the polymeric binder can range from 5:1 to 30:1, from 10:1 to 25:1, or from 15:1 to 20:1.

In a particular embodiment, the solvent of the green body composition can include water. In a certain particular embodiment, the solvent can consist essentially of water except for unavoidable impurities.

In a further certain aspect, the green body composition can include one or more optional additives, for example, a surfactant, a dispersing agent, a pH modifier, a buffer, a filler, or a viscosity modifying agent.

In a further aspect, the green body composition can have a pH between 1 and 12, particularly between 3 and 11. In a certain particular aspect the pH is at least 4.5 and not greater than 10, or at least 7 and not greater than 10.

In one aspect, the amount of MOFs in the green body composition can be at least 10 wt %, or at least 15 wt %, or at least 20 wt %, or at least 25 wt %, or at least 30 wt % or at least 50 wt %, or at least 70 wt % or at least 80 wt %. In another aspect, the amount of MOFs may be not greater than 90 wt %, or not greater than 80 wt %, or not greater than 70 wt %, or not greater than 60 wt %, or not greater than 50 wt %, or not greater than 40 wt %, or not greater than 30 wt %, or not greater than 25 wt %, or not greater than 20 wt %. The amount of MOFs in the green body composition can be a value between any of the minimum and maximum numbers noted above.

In a further aspect, the amount of the polymeric binder in the green body composition can be at least 2 wt % based on the total weight of the green body composition, or at least 5 wt %, or at least 10 wt %, or at least 20 wt %. In another aspect, the amount of the polymeric binder in the green body composition may be not greater than 50 wt %, or not greater than 30 wt %, or not greater than 20 wt %, or not greater than 10 wt %. The amount of binder in the green body composition can be a value between any of the minimum and maximum numbers noted above.

In yet a further aspect, the amount of solvent in the green body composition can be at least 10 wt % based on the total weight of the green body composition, such as at least 20 wt %, or at least 30 wt %, or at least 40 wt %, or at least 50 wt %, or at least 60 wt %. In another aspect, the amount of the solvent may be not greater than 80 wt % based on the total weight of the green body composition, or not greater than 60 wt %, or not greater than 50 wt %, or not greater than 30 wt %. The amount of solvent in the green body composition can be a value between any of the minimum and maximum numbers noted above.

In a particular embodiment, the green body composition can be a paste adapted to be suitable for filling a mold, or passing a screen, or for conducting extrusion. In a certain aspect, the paste can be filled in a mold to form a shaped green body, for example, a belt having shaped openings, and the shaped green body may be cured at elevated temperatures to form the monolithic body.

The temperature for curing the green body can be at least 60° C., or at least 80° C., or at least 100° C., or at least 130° C. In another aspect, the temperature for curing may be not greater than 250° C., or not greater than 200° C., or not greater than 150° C.

In one particular embodiment, the monolithic body of the present disclosure can be a filter or filter material adapted for filtering a gas or a fluid by adsorbing a specific analyte.

The monolithic body of the present disclosure can have a good strength. In one embodiment, the average crush strength of the monolithic body can be at least 5 N, or at least 10 N, or at least 15 N, or at least 20 N, or at least 15 N, or at least 30 N, or at least 35 N. In another aspect, the crush strength can be not greater than 150 N, or not greater than 100 N, or not greater than 50 N, or not greater than 40 N. The average crush strength can be a value between any of the minimum and maximum numbers listed above, such as from 10 N to 100 N, or from 20 N to 50 N, or from 25 N to 45 N. As used herein, the crush strength has been determined by testing pellets having a diameter of 1.60 mm and a thickness of 0.76 mm.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1. A monolithic body comprising metal organic frameworks (MOFs) and a polymeric binder, wherein the polymeric binder comprises a first polymer and a second polymer, the first polymer being water-insoluble with a water solubility of not greater than 5 g/L of water at 25° C., and the second polymer being water-soluble with a water solubility of at least 10 g/L of water at 25° C.; an amount of the polymeric binder is at least 3 wt % based on the total weight of the MOFs and the polymeric binder; and an average crush strength of the monolithic body is at least 10 N.

Embodiment 2. The monolithic body of Embodiment 1, wherein the monolithic body has a normalized functionality ratio (NFR) of at least 0.5, the NFR being a ratio of a property of the monolithic body to the property of the MOFs before inclusion in the monolithic body.

Embodiment 3. The monolithic body of Embodiment 2, wherein the property of the NFR is selected from a specific surface area (SSA); an adsorption capacity for an analyte; a pore volume; a porosity, or a combination thereof.

Embodiment 4. The monolithic body of Embodiment 4, wherein the NFR is at least 0.55, or at least 0.6, or at least 0.65, or at least 0.7, or at least 0.75, or at least 0.8, or at least 0.85, or at least 0.9, or at least 0.95, or at least 0.98.

Embodiment 5. The monolithic body of Embodiments 3 or 4, wherein the property of the NFR is the specific surface area (SSA).

Embodiment 6. The monolithic body of any one of the preceding Embodiments, wherein a specific surface area (SSA) of the monolithic body at least 850 $m^2/g$, or at least 900 $m^2/g$, or at least 950 $m^2/g$, or at least 1000 $m^2/g$, or at least 1050 $m^2/g$, or at least 1100 $m^2/g$, or at least 1150 $m^2/g$, or at least 1200 $m^2/g$, or at least 1250 $m^2/g$, or at least 1300 $m^2/g$, or at least 1350 $m^2/g$, or at least 1400 $m^2/g$.

Embodiment 7. The monolithic body of any one of the preceding Embodiments, wherein a specific surface area (SSA) is not greater than 2500 $m^2/g$, or not greater than 2000 $m^2/g$, or not greater than 1500 $m^2/g$.

Embodiment 8. The monolithic body of Embodiment 3, wherein the analyte includes at least one of water, carbon dioxide, methane, ammonia, hydrogen, a water pollutant, or an air pollutant.

Embodiment 9. The monolithic body of Embodiment 8, wherein the NFR of the adsorption capacity of the analyte is at least 0.6, or at least 0.65, or at least 0.7, or at least 0.75, or at least 0.8, or at least 0.85, or at least 0.9, or at least 0.95, or at least 0.96, or at least 0.97, or at least 0.98, or at least 0.99.

Embodiment 10. The monolithic body of any one of the preceding Embodiments, wherein the monolithic body comprises a water adsorption capacity of at least 0.10 g $H_2O$/g MOF, or 0.15 g $H_2O$/g MOF at a temperature of 25° C. and a relative humidity of 30%, or at least 0.17 g $H_2O$/g MOF, or least 0.20 g $H_2O$/g MOF, or at least 0.25 g $H_2O$/g MOF, or at least 0.30 g $H_2O$/g MOF.

Embodiment 11. The monolithic body of any one of the preceding Embodiments, wherein the monolithic body comprises a water adsorption capacity of at least 0.15 g $H_2O$/g MOF at a temperature of 25° C. and a relative humidity of 80%, or at least 0.17 g $H_2O$/g MOF, or least 0.20 g $H_2O$/g MOF, or at least 0.25 g $H_2O$/g MOF, or at least 0.30 g $H_2O$/g MOF Embodiment 12. The monolithic body of any one of the preceding Embodiments, wherein the MOFs comprise an average particle size (D50) of at least 0.020 μm, or at least 0.050 μm, or at least 0.1 μm, or at least 0.2 μm, or at least 0.5 μm, or at least 1 μm, or at least 3 μm, or at least 5 μm, or at least 8 μm, or at least 10 μm.

Embodiment 13. The monolithic body of any one of the preceding Embodiments, wherein the MOFs comprise an average particle size (D50) of not greater than 1000 μm, or not greater than 800 μm, or not greater than 500 μm, or not greater than 300 μm, or not greater than 200 μm, or not greater than 100 μm, or not greater than 50 μm, or not greater than 10 μm, or not greater than 7 μm, or not greater than 5 μm, or not greater than 1 μm, or not greater than 0.5 μm, or not greater than 0.1 μm.

Embodiment 14. The monolithic body of any one of the preceding Embodiments, wherein the MOFs can be shaped MOF particles.

Embodiment 15. The monolithic body of Embodiment 14, wherein an aspect ratio of length to width of the shaped MOF particles is greater than 1.0.

Embodiment 16. The monolithic body of Embodiments 14 or 15, wherein the aspect ratio length to width of the shaped MOF particles is at least 1.1, or at least 1.5, or at least 2.0, or at least 3.0, or at least 5.0, or at least 10.0.

Embodiment 17. The monolithic body of any one of the preceding Embodiments, wherein the MOFs comprise aluminum fumarate, or MIL-100, or MIL-101, or Numat-11, or Numat-25, or UIO-66, or a transition metal based MOF, or MOF-0, MOF-2, MOF-3, MOF-4, MOF-5, MOF-6, MOF-7, MOF-8 MOF-9, MOF-11, MOF-12, MOF-20, MOF-25, MOF-26, MOF-31, MOF-32, MOF-33, MOF-34, MOF-36, MOF-37, MOF-38, MOF-39, MOF-47, MOF-49, MOF-69a, MOF-69b, MOF-74, MOF-101, MOF-102, MOF-107, MOF-108, MOF-110, MOF-177, MOF-j, MOF-n, IRMOF-1, IRMOF-2, IRMOF-3, IRMOF-4, IRMOF-5, IRMOF-6, IRMOF-7, IRMOF-8, IRMOF-9, IRMOF-10, IRMOF-11, IRMOF-12, IRMOF-13, IRMOF-14, IRMOF-15, IRMOF-16, IRMOF-17, IRMOF-18, IRMOF-19, IRMOF-20, AS16, AS27-2, AS32, AS54-3, AS61-4, AS68-7, BPR43G2, BPR48A2, BPR49B1, BPR68D10, BPR69B1, BPR73E4, BPR76D5, BPR80D5, BPR92A2, BPR95C5, UiO-67, UiO-68, NO13, NO29, NO305, NO306A, NO330, NO332, NO333, NO335, NO336, HKUST-1, UTSA-16, or any combination thereof.

Embodiment 18. The monolithic body of any one of the preceding Embodiments, wherein a weight % ratio of the MOFs to the binder in the monolithic body is at least 5:1, or at least 8:1, or at least 10:1, or at least 15:1, or at least 20:1, or at least 30:1, or at least 40:1, or at least 50:1.

Embodiment 19. The monolithic body of any one of the preceding Embodiments, wherein a weight % ratio of the MOFs to the binder in the monolithic body is not greater than 100:1, or not greater than 70:1, or not greater than 50:1, or not greater than 30:1, or not greater than 20:1, or not greater than 15:1, or not greater than 10:1.

Embodiment 20. The monolithic body of any one of the preceding Embodiments, wherein an amount of the MOFs is at least 70 wt % based on the total weight of the monolithic body, or at least 75 wt %, or at least 80 wt %, or at least 85 wt %, or at least 90 wt %, or at least 95 wt %, or at least 98 wt %.

Embodiment 21. The monolithic body of any one of the preceding Embodiments, wherein an amount of the MOFs is not greater than 99.5 wt % based on the total weight of the monolithic body, such as not greater than 99 wt %, or not greater than 97 wt %.

Embodiment 22. The monolithic body of any one of the preceding Embodiments, wherein an amount of the binder is not greater than 30 wt % based on the total weight of the monolithic body, or not greater than 25 wt %, or not greater than 20 wt %, or not greater than 15 wt %, or not greater than 10 wt %, or not greater than 5 wt %, or not greater than 3 wt %.

Embodiment 23. The monolithic body of any one of the preceding Embodiments, wherein an amount of the binder is at least 0.5 wt %, based on the total weight of the monolithic body, or at least 1 wt %, or at least 3 wt %, or at least 5 wt %.

Embodiment 24. The monolithic body of any one of the preceding Embodiments, wherein the monolithic body is a pellet, a tube, a sheet, has a round shape, or has an irregular shape.

Embodiment 25. The monolithic body of Embodiment 24, wherein the monolithic body is a pellet.

Embodiment 26. The monolithic body of Embodiment 25, wherein the pellet has an aspect ratio of length to thickness of 1:1 to 10:1.

Embodiment 27. The monolithic body of Embodiments 24 or 25, wherein a thickness of the pellet is at least 0.1 mm, or at least 0.3 mm, or at least 0.5 mm, or at least 0.8 mm, or at least 1.0 mm, or at least 1.2, mm, or at least 1.4 mm, or at least 1.6 mm or at least 1.8 mm, or at least 2.0 mm.

Embodiment 28. The monolithic body of Embodiments 24 or 25, wherein the thickness of the pellet is not greater than 5.0 mm, or not greater than 4.0 mm, or not greater than 3.0 mm, or not greater than 2.0 mm, or not greater than 1.0 mm.

Embodiment 29. The monolithic body of any one of Embodiments 24-28, wherein a length of the pellet is at least 0.5 mm, or at least 1.0 mm. or at least 1.3 mm, or at least 1.5 mm, or at least 2.0 mm, or at least 3 mm, or at least 5 mm.

Embodiment 30. The monolithic body of any one of Embodiments 24-28, wherein a length of the pellet is not greater than 10 mm, or not greater than 8 mm, or not greater than 5 mm, or not greater than 3.0 mm, or not greater than 2.0 mm.

Embodiment 31. The monolithic body of any one of the preceding Embodiments, wherein a crush strength of the monolithic body is at least 5 N, or at least 10 N, or at least 15 N, or at least 20 N, or at least 15 N, or at least 30 N, or at least 35 N.

Embodiment 32. The monolithic body of any one of the preceding Embodiments, wherein a crush strength of the monolithic body is not greater than 150 N, or not greater than 100 N, or not greater than 50 N, or not greater than 40 N.

Embodiment 33. The monolithic body of any one of the preceding Embodiments, wherein the first polymer comprises functional groups and the second polymer comprises functional groups, and the functional groups of the first polymer are capable of forming covalent bonds with the functional groups of the second polymer.

Embodiment 34. The monolithic body of Embodiment 33, wherein the functional groups of the first polymer are selected form amine groups, hydroxyl groups, acrylate groups, vinyl groups, thiol groups, carboxyl groups or epoxy groups.

Embodiment 35. The monolithic body of Embodiments 33 or 34, wherein the functional groups of the second polymer are selected from carboxyl groups, hydroxyl groups, amine groups, acrylate groups or vinyl groups.

Embodiment 36. The monolithic body of any one of the preceding Embodiments, wherein the first polymer includes at least one polyacrylate, a polystyrene, an epoxide polymer, a polyurethane, a polyester, a polyether, a polyamide, a polyimide, or any combination or copolymer thereof.

Embodiment 37. The monolithic body of Embodiment 36, wherein the first polymer is an emulsion polymer.

Embodiment 38. The monolithic body of Embodiments 36 or 37, wherein the first polymer includes a polyacrylate comprising amine functionality.

Embodiment 39. The monolithic body of any one of the preceding Embodiments, wherein the second polymer includes a polysaccharide, a polyethylene glycol, a polyamide, a polyvinyl alcohol, or a polyacrylate.

Embodiment 40. The monolithic body of Embodiment 39, wherein the second polymer includes a polysaccharide, the polysaccharide being selected from a cellulose derivative, or a starch derivative, an alginate, or an alginate derivative.

Embodiment 41. The monolithic body of Embodiment 40, wherein the polysaccharide includes a salt of carboxymethyl cellulose.

Embodiment 42. The monolithic body of any one of the preceding Embodiments, wherein the polymeric binder includes an at least partially cross-linked polymer of the polymer 1 and the polymer 2.

Embodiment 43. The monolithic body of Embodiment 42, wherein the first polymer includes a polyacrylate comprising amine functionality, and the second polymer includes sodium carboxymethyl cellulose, and the polyacrylate comprising amine functionality is at least partially cross-linked with the sodium carboxymethyl cellulose (NaCMC).

Embodiment 44. The monolithic body of any one of the preceding Embodiments, wherein a weight percent ratio of the polymer 1 to the polymer 2 (P1:P2) ranges from 1:10 to 10:1, or from 1:5 to 5:1, or from 1:2 to 4:1, or from 1:1 to 3:1.

Embodiment 45. The monolithic body of any one of the preceding Embodiments, wherein the monolithic body further includes an inorganic binder.

Embodiment 46. The monolithic body of Embodiment 45, wherein the inorganic binder comprises hydroxyl groups.

Embodiment 47. The monolithic body of Embodiments 45 or 46, wherein the inorganic binder comprises aluminum hydroxide.

Embodiment 48. The monolithic body of Embodiment 47, wherein the inorganic binder comprises boehmite of gibbsite.

Embodiment 49. The monolithic body of any one of the preceding Embodiments, wherein the monolithic body comprises a first pore structure and a second pore structure, wherein the first pore structure relates to open pores of particles of the MOFs, and the second pore structure related to open pores formed within the binder and between the binder and the particles of the MOFs.

Embodiment 50. The monolithic body of Embodiment 49, wherein an average pore size of the first pore structure is different than an average pore size of the second pore structure.

Embodiment 51. The monolithic body of Embodiment 50, wherein the average pore size of the second pore structure is greater than the average pore size of the first pore structure.

Embodiment 52. The monolithic body of any one of the preceding Embodiments, wherein the binder is permeable to an analyte that can be adsorbed by the MOFs.

Embodiment 53. The monolithic body of Embodiment 52, wherein the analyte includes at least one of water, carbon dioxide, hydrogen, methane, ammonia, a water pollutant, or an air pollutant.

Embodiment 54. The monolithic body of any one of the preceding Embodiments, wherein a density of the monolithic body is at least 1.5 g/$cm^3$, or at least 1.8 g/$cm^3$, or at least 2.0 g/$cm^3$, or at least 2.2 g/$cm^3$, or at least 2.3 g/$cm^3$.

Embodiment 55. The monolithic body of any one of the preceding Embodiments, wherein a density of the monolithic body is not greater than 3.5 g/$cm^3$, or not greater than 3.0 g/$cm^3$, of not greater than 2.8 g/$cm^3$, or not greater than 2.6 g/$cm^3$.

Embodiment 56. A method of preparing a monolithic body including metal organic frameworks (MOFs), comprising preparing a green body composition, the green body composition including MOFs, a first polymer and a second polymer, wherein the first polymer has a water solubility of not greater than 5 g/L of water at 25° C., and the second polymer having a water solubility of at least 10 g/L of water at 25° C.; forming a shaped green body from the green body composition; and curing the shaped green body to obtain the monolithic body.

Embodiment 57. The method of Embodiment 56, wherein curing comprises heat treating at a temperature of at least 60° C., or at least 80° C., or at least 100° C., or at least 130° C.

Embodiment 58. The method of Embodiment 56, wherein curing comprises heat treating at a temperature of not greater than 350° C., or not greater than 300° C., or not greater than 250° C., or not greater than 200° C., or not greater than 160° C., or not greater than 130° C.

Embodiment 59. The method of any one of Embodiments 56-58, wherein forming the shaped green body includes screen printing, extrusion, slip-casting, injection molding, or 3D-printing.

Embodiment 60. The method of any one of Embodiments 56-59, the green body composition is a paste.

Embodiment 61. The method Embodiment 60, wherein the paste has a water content of not greater than 50 wt % based on the total weight of the green body composition, or not greater than 40 wt %, or not greater than 30 wt %, or not greater than 25 wt %.

Embodiment 62. The method of any one of Embodiments 56-61, wherein the polymeric binder is selected from any of the polymeric binders of Embodiments 33-44.

EXAMPLES

The following non-limiting examples illustrate the present invention.

Example 1

A two-component polymeric binder system containing a water-insoluble polymer (polymer 1) and a water-soluble polymer (polymer 2) was used with the following polymer combination: As water-insoluble polymer was used Rhoplex GL-618, an acrylic polymer emulsion, together with sodium carboxymethyl cellulose (NaCMC) with a molecular weight of 90,000 g/mol (product 12M8P from Ashland), a water-soluble cellulose derivative.

First, a paste was prepared by combining 10 g MOF powder of type UTSA-16, a cobalt citrate type compound suitable for adsorbing $CO_2$, with a D50 particles size of about 5 microns; 2.12 g of Rhoplex GL-618 (having 47 wt % content of solids); and 2 g of the NaCMC, 10 wt % aqueous solution of NaCMC, and hand-kneading the mixture for 3 minutes. The paste, herein also called green body composition, was further subjected to forming pellet-shaped green bodies via screen printing, followed by curing the shaped green bodies. The total amount of polymeric binder in the cured pellets was about 11 wt % based on the total weight of polymeric binder and MOF.

The above-described screen-printing was conducted by using a belt made of PEEK having a thickness of 0.76 mm and containing round through-holes with a diameter of 1.6 mm. The through holes of the belt were filled with the paste via a spatula. The screen printed pellets were dried by heating for one hour at 100° C.

Crush Strength Measurement

The pellets were subjected to a crush strength test using an MTS Sintech 2/G system with load cell sensitivity to 0.01 N. The head of the measuring unit was positioned just to touching the test pellet, and crushing was performed using constant displacement. The displacement was set at 2 μm/s until failure of the pellets occurred. Failure was indicated by the instrument by the sudden drop of the load from the maximum load.

The average crush strength obtained for the above-described pellets comprising the polymeric binder combination of Rhoplex GL618 and NaCMC was 37 N.

A summary of the crush strength test results is shown in Table 1.

TABLE 1

| Sample | Binder | Average Crush strength [N] | Density [g/$cm^3$] |
|---|---|---|---|
| S1 | P1 + P2 combination | 37 | 2.0458 |
| S2 | Boehmite | 21.5 | 2.552 |
| S3 | Arginate | 13 | 2.3983 |

MOF Containing Pellets with Boehmite Binder

A paste was formed by combining 5 g MOF (UTSA-16), 0.68 g boehmite (P2 Disperal from Sasol) and 3 g deionized water, and hand kneading the mixture for 3 minutes.

The screen-printing was conducted the same way as described above for the polymeric binder containing pellets, except that the heating was conducted for two hours at 150° C.

The results of the crush strength testing (sample S2) are also summarized in Table 1. It can be seen that the pellets formed with the boehmite binder had a lower crush strength in comparison to the pellets made with the polymeric binder combination of polymer 1 and polymer 2.

MOF Containing Pellets with Alginate Binder

A paste was formed by combining 6.41 g MOF (UTSA-16, a $CO_2$-adsorbing MOF with a D50 size of about 5 microns) with 3.14 g ammonium alginate (ammonium alginate in 4 wt % water) via hand kneading for 3 minutes.

The screen-printing was conducted the same way as described above for the polymeric binder containing pellets, except that after the filling of the belt holes, the paste in the holes of the belt was exposed to a 30% calcium chloride solution by wiping the surface with a paper towel which was wetted with the calcium chloride solution. After the calcium chloride treatment (which caused cross-linking of the alginate), heating was conducted for 15 minutes at 100° C.

The crush strength testing results show an average crush strength of 13 N for the pellets made with alginate as binder, which was lower than the crush strength of the pellets containing the polymeric binder combination, or the boehmite binder.

Example 2

A series of MOF-containing pellets was prepared by combining the two-component polymeric binder combination of Rhoplex GL-618 (polymer 1) and NaCMC (polymer 2), as also used in Example 1, with metal organic framework powder of the type MIL-100(Fe) (from AEOL). MIL-100 (Fe) is an iron (III)-based compound with trimesic acid ligands, with a D50 particle size of about 9.4 microns (measured with Horiba LA-950 laser scattering particle size analyzer). The samples were varied by the total amount of polymeric binder (5 wt %, 10 wt %, 15 wt %, and 20 wt % based on the total weight of MOFs and polymeric binder) and by varying the ratio of Rhoplex GL-618 (polymer 1) to NaCMC (polymer 2). The weight percent ratios of polymer 1 to polymer 2 (P1 to P2) were 1.5 to 1.0; 1.0 to 1.0; 1.0 to 1.5; 1.0 to 2.33 and 1 to 4. Each sample was hand-kneaded for 3 minutes and minor amounts of water added, if needed, to form a paste (green body composition), and submitted to screen-printing and curing as described in Example 1.

From the obtained pellets the specific surface area (SSA) was measured according to the BET method, using a Micromeritics TriStar II Plus gas adsorption analyzer. The measurements were made using nitrogen gas as the adsorptive.

Furthermore, the crush strength (CS) of the pellets with the polymer ratio 1.5 to 1.0; and 1.0 to 1.0; and 1.0 to 4.0 were measured at different total binder concentrations the same way as described in Example 1.

A summary of the SSA values, the calculated NFR, and the crush strengths for the pellets is shown in Tables 2, 3, and 4.

TABLE 2

| Sample | Total Binder P1 + P2 [wt %] | P1:P2 = 1.5:1 SSA [$m^2$/g] | CS [N] |
|---|---|---|---|
| S4 | 5 | 1277 | 25.2 |
| S5 | 10 | 1138 | 32.9 |
| S6 | 15 | 1007 | 43 |
| S7 | 20 | 882 | |

TABLE 3

| Sample | Total Binder P1 + P2 [wt %] | P1:P2 = 1:1 SSA [$m^2$/g] | CS [N] |
|---|---|---|---|
| S8 | 5 | 1307 | 16.8 |
| S9 | 10 | 1124 | 19.5 |
| S10 | 15 | 1159 | 27.5 |
| S11 | 20 | 803 | 55.5 |

TABLE 4

| Sample | Total Binder P1 + P2 [wt %] | P1:P2 = 1:1.5 SSA [$m^2$/g] | CS [N] |
|---|---|---|---|
| S12 | 5 | 1219 | 13.4 |
| S13 | 10 | 1039 | 29.4 |
| S14 | 15 | 978 | |
| S15 | 20 | 844 | |

Not shown in tables above is the SSA for pellets having a ratio of P1:P2 being 1:2.33 and a total amount of binder of 15 wt % (sample S16), for which an SSA of 1135 $m^2$/g was measured; and for pellets having a ratio of P1:P2 of 1:1.5, wherein the SSA at a total binder amount of 5 mg was 1296 $m^2$/g (sample 17), and the SSA for 15 wt % total binder was 1006 $m^2$/g (sample 18).

It can be seen from the summarized data that the highest SSA was obtained with a weight percent ratio of Rhoplex to NaCMC (P1 to P2) being 1:1. Very similar SSA values could be obtained with a binder ratio P1 to P2 of 1.5:1, with the advantage of increasing the crush strength.

Comparative examples were made by preparing pellets made only with Rhoplex GL618 (polymer 1) and Mil-100 (Fe). A pellet containing 32 wt % Rhoplex (polymer 1) as the only binder and Mil-100(Fe) had an SSA of 82 $m^2$/g. Furthermore, a pellet made without any binder and only water, maintained the pellet shape after drying, but had a very low crush strength of 2.4 N, and an SSA of 1251 $m^2$/g.

The experiments further show that high normalized functionality ratios (NFR) can be obtained using the combination of polymer 1 and polymer 2 in specific weight % ratios and total amounts of polymeric binder.

Comparative Polymeric Binder Combinations

Pellets as described above for the binder combination of Rhoplex GL618 and NaCMC are prepared but using different types of polymer combinations in a total amount of polymeric binder being 10 wt % and a weight percent ratio of 1:1.

The following polymeric binder combinations are tested: 1) Zusoplast PS1 (water-soluble) and polyethylene oxide (water insoluble at 25° C.); 2) NaCMC (water-soluble) and polyethyleneimine (water-soluble); and 3) Rhoplex GL618 (water-insoluble) and Maincote 5045 (water-insoluble).

It is observed that pellets made with the comparative binder combinations have either a low SSA or an inferior crush strength compared to the pellets comprising the binder combination Rhoplex GL618/NaCMC.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention.

What is claimed is:

1. A monolithic body comprising metal organic frameworks (MOFs) and a polymeric binder, wherein the polymeric binder comprises a first polymer and a second polymer, the first polymer being water-insoluble with a water solubility of not greater than 5 g/L of water at 25° C., and the second polymer being water-soluble with a water solubility of at least 10 g/L of water at 25° C.;

an amount of the polymeric binder is at least 3 wt % based on the total weight of the MOFs and the polymeric binder;

an average crush strength of the monolithic body is at least 10 N; and a density of the monolithic body is at least 1.5 g/$cm^3$.

2. The monolithic body of claim 1, wherein a weight % ratio of the MOFs to the polymeric binder in the monolithic body is at least 5:1.

3. The monolithic body of claim 1, wherein an amount of the MOFs is at least 70 wt % based on the total weight of the monolithic body.

4. The monolithic body of claim 1, wherein an amount of the polymeric binder is at least 3.0 wt % and not greater than 15 wt % based on the total weight of the MOFs and the polymeric binder.

5. The monolithic body of claim 1, wherein the crush strength of the monolithic body is at least 25 N.

6. The monolithic body of claim 1, wherein the first polymer comprises functional groups and the second polymer comprises functional groups, and the functional groups of the first polymer are capable of forming covalent bonds with the functional groups of the second polymer.

7. The monolithic body of claim 1, wherein a weight percent ratio of the first polymer to the second polymer (P1:P2) ranges from 1:10 to 10:1.

8. The monolithic body of claim 1, wherein a specific surface area (SSA) of the monolithic body is at least 850 $m^2/g$.

9. The monolithic body of claim 8, wherein the specific surface area (SSA) of the monolithic body is at least 1200 $m^2/g$.

10. The monolithic body of claim 1, wherein the first polymer includes at least one polyacrylate, a polystyrene, an epoxide polymer, a polyurethane, a polyester, a polyether, a polyamide, a polyimide, or any combination or copolymer thereof.

11. The monolithic body of claim 10, wherein the first polymer includes a polyacrylate comprising amine functionality.

12. The monolithic body of claim 1, wherein the polymeric binder includes an at least partially cross-linked polymer of the first polymer and the second polymer.

13. The monolithic body of claim 12, wherein the first polymer includes a polyacrylate comprising amine functionality, and the second polymer includes a salt of carboxymethyl cellulose.

14. The monolithic body of claim 1, wherein the polymeric binder is permeable to an analyte that can be adsorbed by the MOFs.

15. The monolithic body of claim 14, wherein the analyte includes water, carbon dioxide, hydrogen, methane, ammonia, a water pollutant, or an air pollutant.

16. The monolithic body of claim 1, wherein the second polymer includes a polysaccharide, a polyethylene glycol, a polyamide, a polyvinyl alcohol, or a polyacrylate.

17. The monolithic body of claim 16, wherein the second polymer includes a polysaccharide, and wherein the polysaccharide is selected from the group consisting of a cellulose derivative, a starch derivative, an alginate, and an alginate derivative.

18. The monolithic body of claim 17, wherein the polysaccharide includes a salt of carboxymethyl cellulose.

19. A monolithic body comprising metal organic frameworks (MOFs) and a polymeric binder, wherein the polymeric binder comprises a first polymer and a second polymer, the first polymer being water-insoluble with a water solubility of not greater than 5 g/L of water at 25° C., and the second polymer being water-soluble with a water solubility of at least 10 g/L of water at 25° C.;

an amount of the polymeric binder is at least 3 wt % based on the total weight of the MOFs and the polymeric binder;

an average crush strength of the monolithic body is at least 10 N, and wherein the first polymer comprises functional groups and the second polymer comprises functional groups, and the functional groups of the first polymer are capable of forming covalent bonds with the functional groups of the second polymer.

20. A monolithic body comprising metal organic frameworks (MOFs) and a polymeric binder, wherein the polymeric binder comprises a first polymer and a second polymer, the first polymer being water-insoluble with a water solubility of not greater than 5 g/L of water at 25° C., and the second polymer being water-soluble with a water solubility of at least 10 g/L of water at 25° C.;

an amount of the polymeric binder is at least 3 wt % based on the total weight of the MOFs and the polymeric binder;

an average crush strength of the monolithic body is at least 10 N; and the first polymer includes a polyacrylate comprising amine functionality.

* * * * *